No. 885,053. PATENTED APR. 21, 1908.
C. JOOS.
BOOK SEWING MACHINE.
APPLICATION FILED MAY 19, 1903.
19 SHEETS—SHEET 1.

Witnesses:
F. W. H. Clay
John Enders Jr.

Inventor:
Conradin Joos
By Paul Synnestvedt
Atty.

No. 885,053. PATENTED APR. 21, 1908.
C. JOOS.
BOOK SEWING MACHINE.
APPLICATION FILED MAY 19, 1903.

Witnesses:
F. W. H. Clay
John Enders Jr.

Inventor
Conradin Joos
By Paul Synnestvedt
Att'y.

No. 885,053. PATENTED APR. 21, 1908.
C. JOOS.
BOOK SEWING MACHINE.
APPLICATION FILED MAY 19, 1903.

No. 885,053. PATENTED APR. 21, 1908.
C. JOOS.
BOOK SEWING MACHINE.
APPLICATION FILED MAY 19, 1903.

Witnesses:

Inventor:
Conradin Joos
By Paul Synnestvedt

No. 885,053. PATENTED APR. 21, 1908.
C. JOOS.
BOOK SEWING MACHINE.
APPLICATION FILED MAY 19, 1903.

Witnesses:
F. W. H. Clay
John Enders Jr.

Inventor:
Conradin Joos
By Paul Synnestvedt
Att'y

No. 885,053.

PATENTED APR. 21, 1908.

C. JOOS.
BOOK SEWING MACHINE.
APPLICATION FILED MAY 19, 1903.

Witnesses:
F. W. H. Clay
John Enders Jr.

Inventor:
Conradin Joos
By Paul Synnestvedt
Att'y.

No. 885,053. PATENTED APR. 21, 1908.
C. JOOS.
BOOK SEWING MACHINE.
APPLICATION FILED MAY 19, 1903.

Witnesses:
F. W. H. Clay
John Enders Jr.

Inventor:
Conradin Joos
By Paul Synnestvedt
Att'ys

No. 885,053. PATENTED APR. 21, 1908.
C. JOOS.
BOOK SEWING MACHINE.
APPLICATION FILED MAY 19, 1903.
19 SHEETS—SHEET 11.
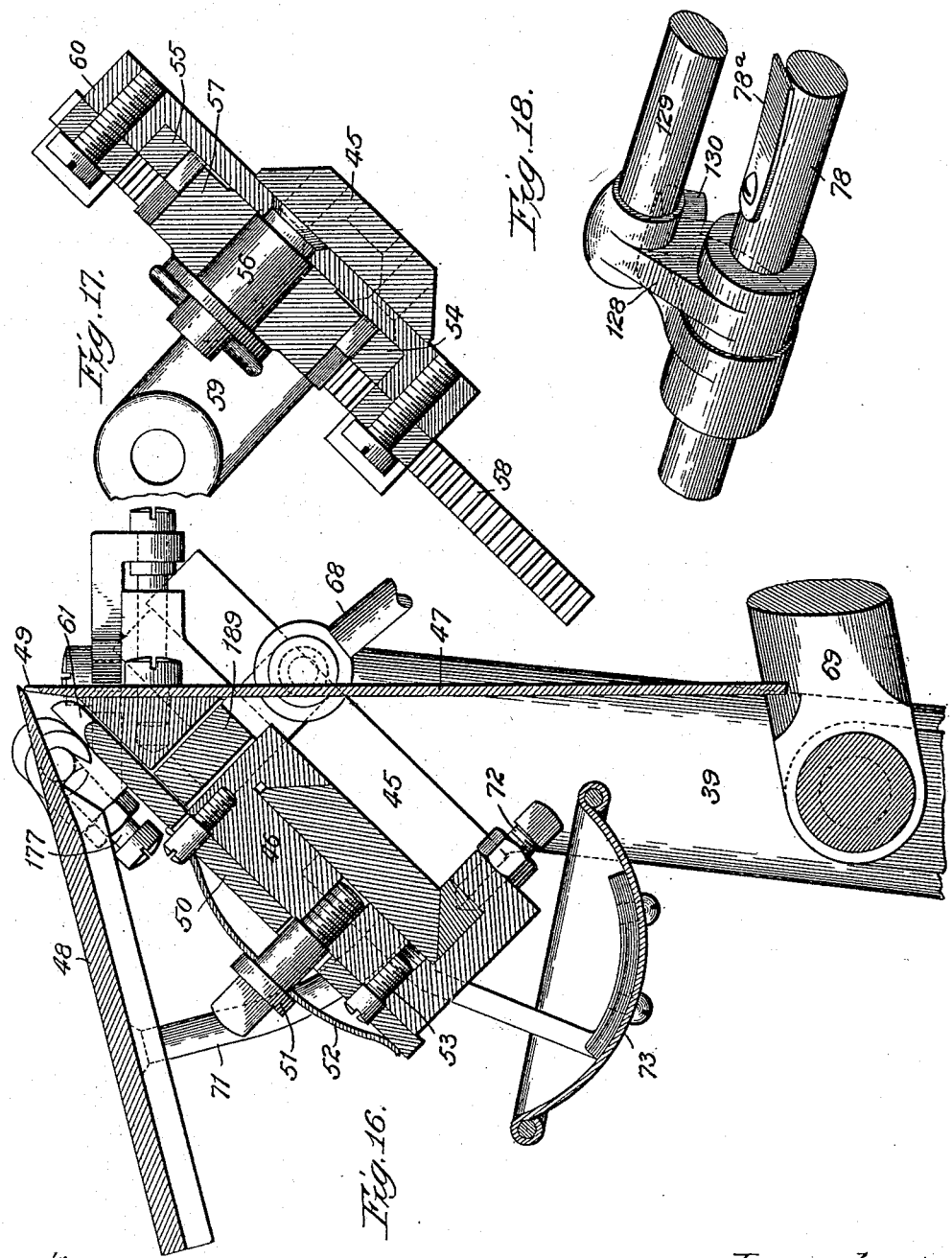

No. 885,053. PATENTED APR. 21, 1908.
C. JOOS.
BOOK SEWING MACHINE.
APPLICATION FILED MAY 19, 1903.
19 SHEETS—SHEET 12.
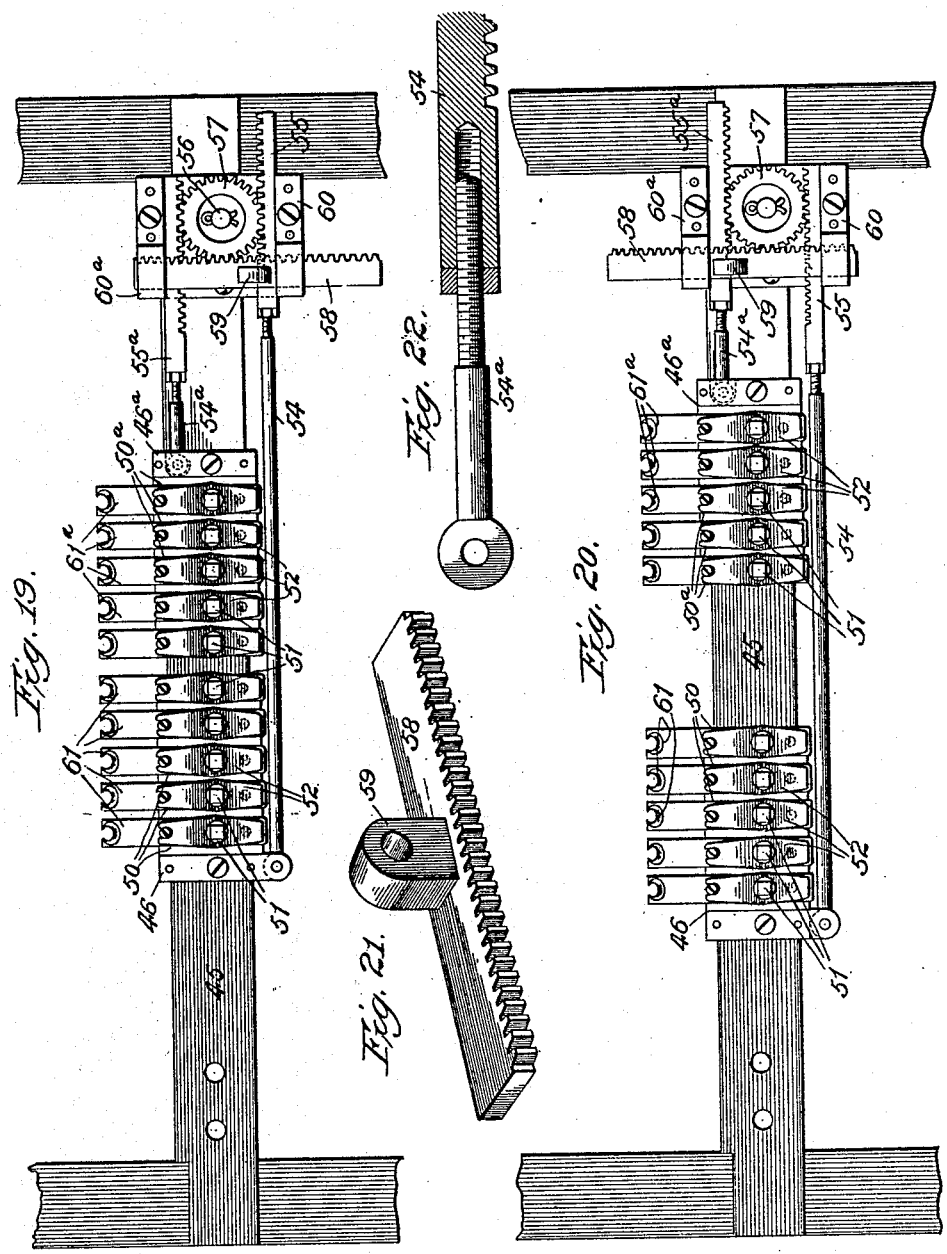

No. 885,053. PATENTED APR. 21, 1908.
C. JOOS.
BOOK SEWING MACHINE.
APPLICATION FILED MAY 19, 1903.
19 SHEETS—SHEET 13.

Witnesses:
F. W. H. Clay
John Enders Jr.

Inventor:
Conradin Joos
By Paul Synnestvedt
Att'y

No. 885,053. PATENTED APR. 21, 1908.
C. JOOS.
BOOK SEWING MACHINE.
APPLICATION FILED MAY 19, 1903.
19 SHEETS—SHEET 14.
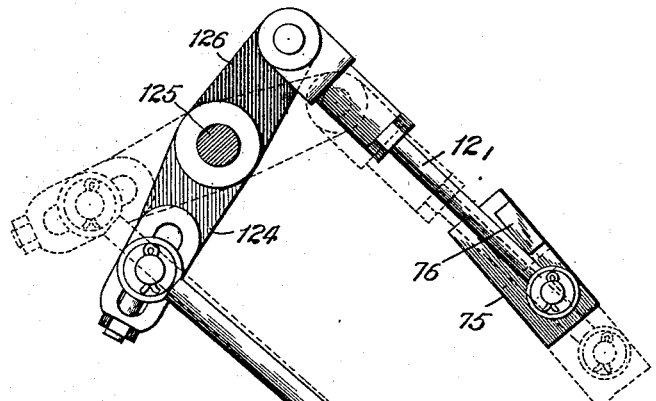
*Fig. 25.*
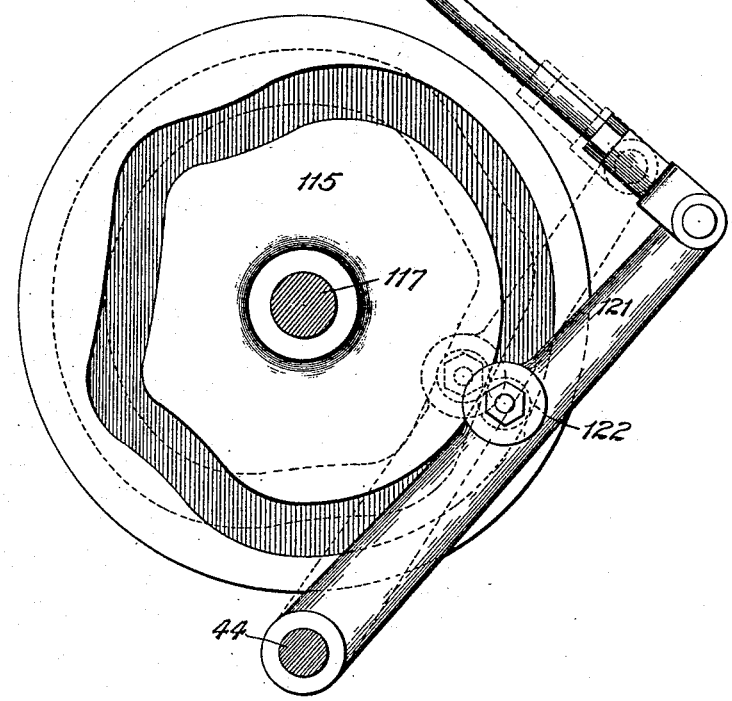
Witnesses: Inventor:
Conradin Joos
By Paul Synnestvedt
Atty.
THE NORRIS PETERS CO., WASHINGTON, D. C.

No. 885,053. PATENTED APR. 21, 1908.
C. JOOS.
BOOK SEWING MACHINE.
APPLICATION FILED MAY 19, 1903.

Witnesses:

Inventor:
Conradin Joos
By Paul Synnestvedt
Att'y

No. 885,053. PATENTED APR. 21, 1908.
C. JOOS.
BOOK SEWING MACHINE.
APPLICATION FILED MAY 19, 1903.
19 SHEETS—SHEET 19.
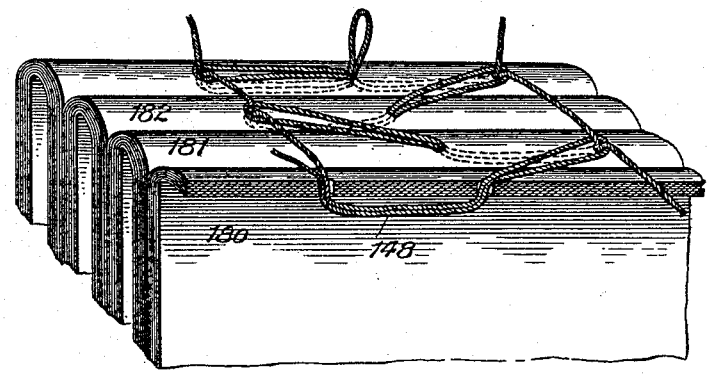
Fig. 30.
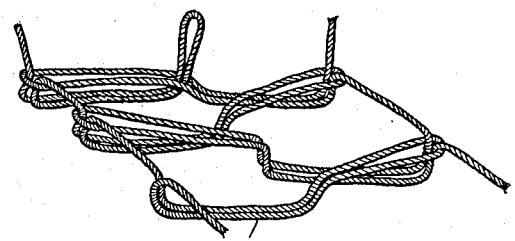
Fig. 31.
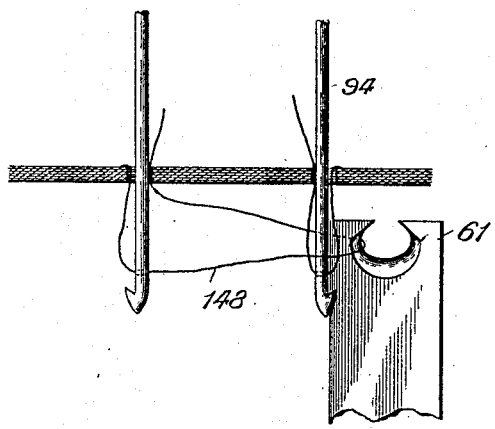
Fig. 32.
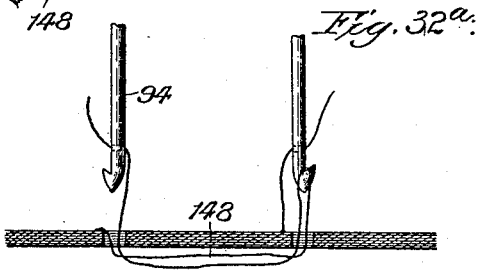
Fig. 32ª.
Witnesses:
F. W. H. Clay
John Enders Jr.
Inventor:
Conradin Joos
By Paul Synnestvedt
Att'y

UNITED STATES PATENT OFFICE.

CONRADIN JOOS, OF FRAUENFELD, SWITZERLAND, ASSIGNOR TO ACTIENGESELLSCHAFT VORMALS F. MARTINI & CIE., OF FRAUENFELD, SWITZERLAND.

BOOK-SEWING MACHINE.

No. 885,053.  Specification of Letters Patent.  Patented April 21, 1908.

Application filed May 19, 1903. Serial No. 157,817.

*To all whom it may concern:*

Be it known that I, CONRADIN JOOS, a citizen of the Republic of Switzerland, residing at Frauenfeld, Canton Thurgau, Switzerland, have invented certain new and useful Improvements in Book-Sewing Machines, of which the following is a specification.

My invention relates to the art of sewing the leaves of books together, and particularly to the kind of machine designed to sew with thread the sections of books known to the trade as "signatures", and to firmly sew together a series of said signatures, and in such sewing to form a certain double lap safety stitch in the thread. The objects of my invention are, to so improve a machine of the character specified as to make it entirely automatic, accurate in its working, easily adjustable, and to facilitate the operation of moving the separate signatures to place and binding them together; also to provide improved mechanism for forming the peculiar stitch which I use, and for carrying out all the operations of sewing the book; also various improvements in the structure, assemblage and operation of the parts of the machine to generally improve its efficiency and accuracy and ease of working, as will be hereinafter fully set forth in the description and pointed out in the claims.

The machine which I have invented is illustrated in preferred form in the accompanying drawings, wherein—

Figures 16 and 17 are detailed sectional views showing the mechanism within the saddle for supporting the signatures and the mounting of the loopers therein, to be hereinafter described.

Figure 18 is a perspective view of the take-up rocker and the tension bar.

Figures 19, 20, 21 and 22 are detail views of the loopers and the rack mechanism for shifting the loopers, to be hereinafter described.

Figure 25 is an enlarged detailed view of the cam, the lever arm, links and the sliding carrier head for imparting the reciprocating motion of the gang of needles.

Figure 30 is a perspective view partly in section, of a series of signatures bound together in a book, showing the position of the stitches taken by the operation of the machine; and Figure 31 is a detached perspective view showing the arrangement of the threads in forming the stitches.

Figure 32 is a diagram illustrating the lower position of the needles, and the operation of the looper; and Figure 32ª shows another position of the needles and looper, showing the drawing out of the loop and formation of the stitch.

Figure 1:
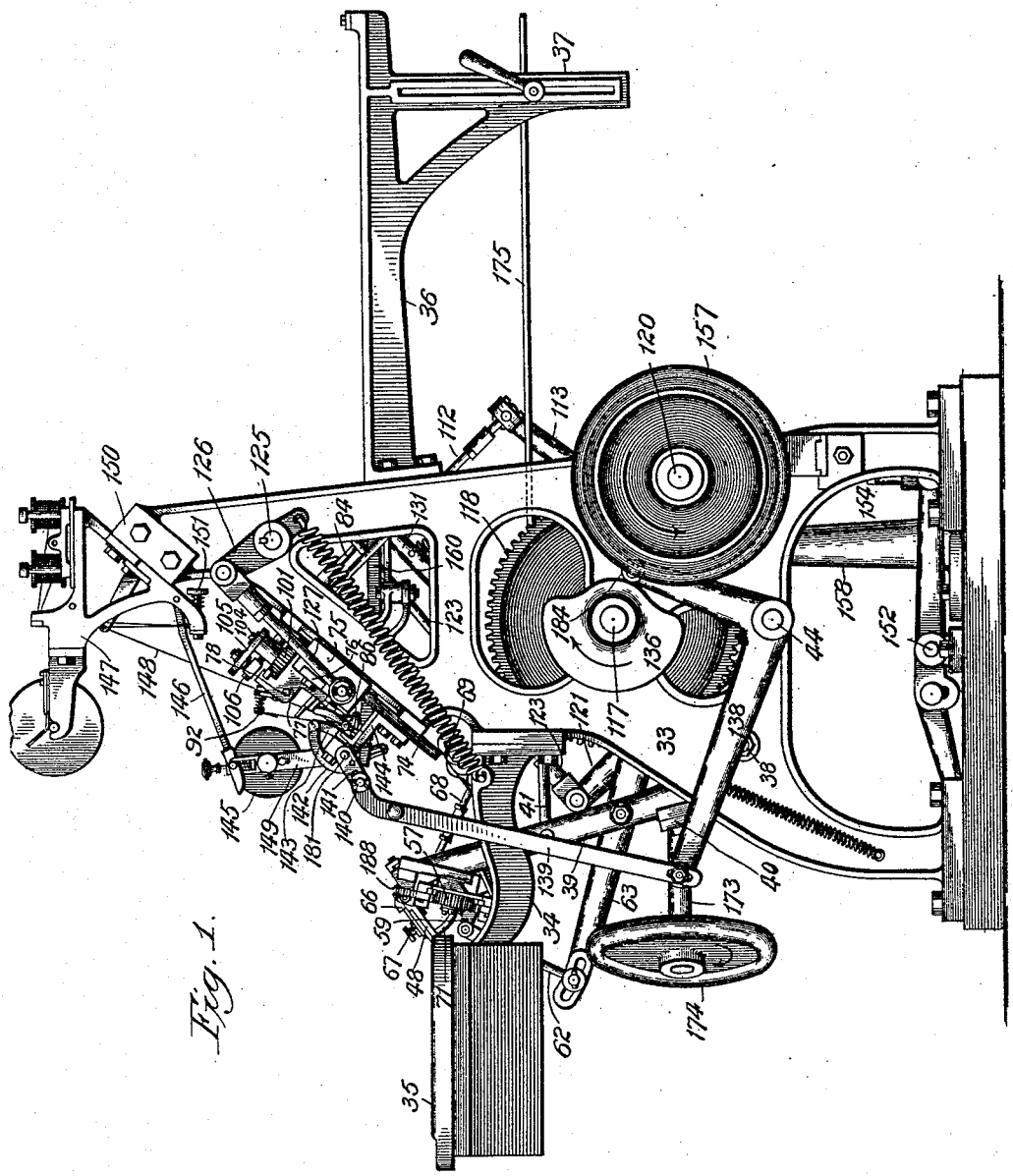
Figure 1 is a right side elevation of the complete machine.
Figure 2:
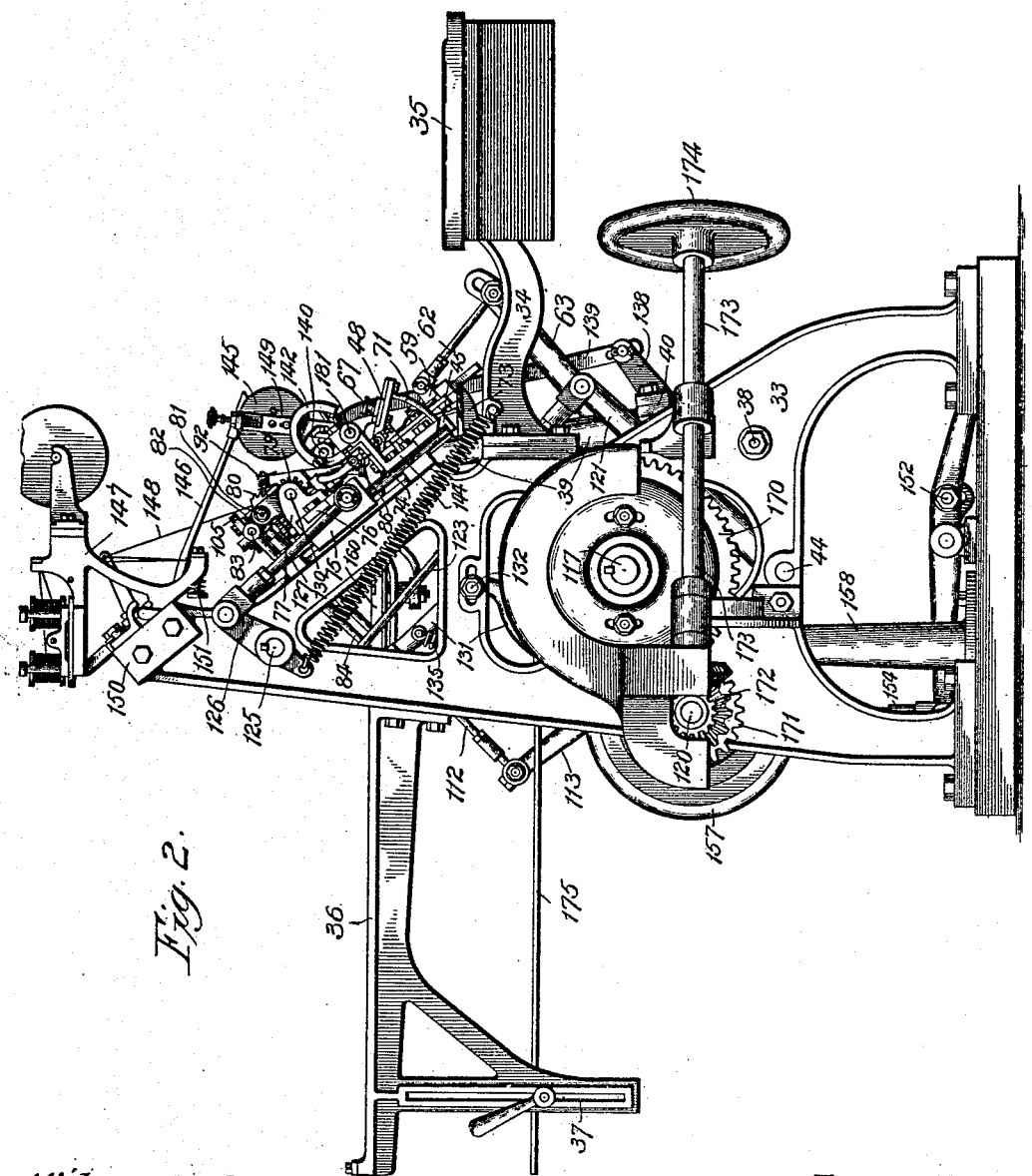
Figure 2 is a left side elevation.

The object of the machine being to stitch the leaves of the sections of a book known as "signatures", and to stitch at the same time several of said signatures together in series, the essential functions to be performed by the machine are the following: The needles are to be thrust through the paper carrying a loop of thread, and slightly withdrawn to form a loop; the looper is to carry the looped thread from the position of one needle to the position of the next needle in the series; the last-named needle is then to enter the loop and have its hook turned in such position as to seize upon the thread; the needle is then to be withdrawn carrying the loop of the first-named needle up through the paper; the position of the thread will then be as shown in Figure 32ª. The next operation necessary is, to shift the position of the needles laterally so that the stitch taken in the following signature shall be alternate in position with respect to the stitch taken in the first signature. The needles then being shifted back laterally so that the needle on the right in Figure 32ª will now be in the position occupied by the needle on the left in said figure, the previously mentioned operation is repeated on the next signature, during the course of which the loop formed by the left needle and drawn up by the one on the right is made to surround the thread now carried down through the signature, by the needle now on the right. In this lateral movement to drag the loop over, the needle is turned with its hook in the direction of the shifting motion, to insure a firm hold on the thread.

The needle during the operation, has the reciprocating movements, the revolving movements, and the laterally shifting movement. The looper hooks have a lateral movement in order to carry the loop from one needle to the position of the next following needle, and are slightly lifted off their seats to avoid the needles. The saddle supporting the signature has a pivotal reciprocating motion to and from its position for operation of the needles. Mechanism is provided by which the signatures after being sewed in place upon the saddle are pushed back to make room for the next, continuously, until the book is completed. The mechanism for performing these functions will now be described in detail by reference to the annexed drawings and the figures thereon, it being understood that the same reference numeral indicates everywhere the same feature of the machine.

Figure 7:
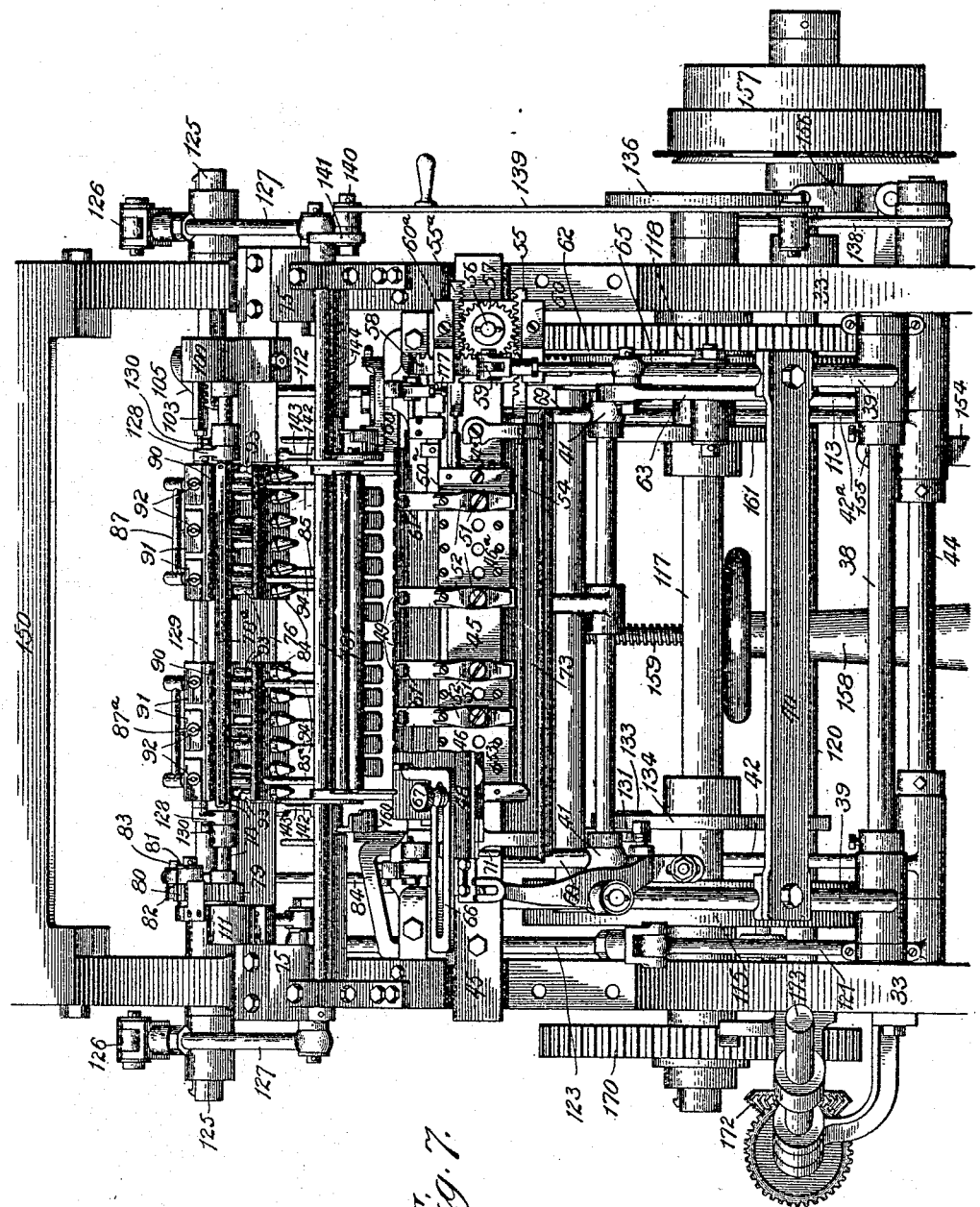
Figure 7 is an enlarged partial front view of the machine, showing the saddle down.

The signatures to be sewed are placed upon the side table 35, shown in Fig. 1, and from this Figure and Fig. 7 it will be seen that upon the upright forming the frame 33 of the machine, on the front side, are two forwardly extending arms 34 carrying this table, and between these two arms the saddle for supporting the signatures is moved. The supporting saddle 48 being in the position shown in Figure 1, the signature is placed thereupon and transferred to the position of the needles and sewed, and then pushed back upon the rail 160, and resting upon the table 175, this latter being adjusted to suit the width of the book leaves.

Figure 4:
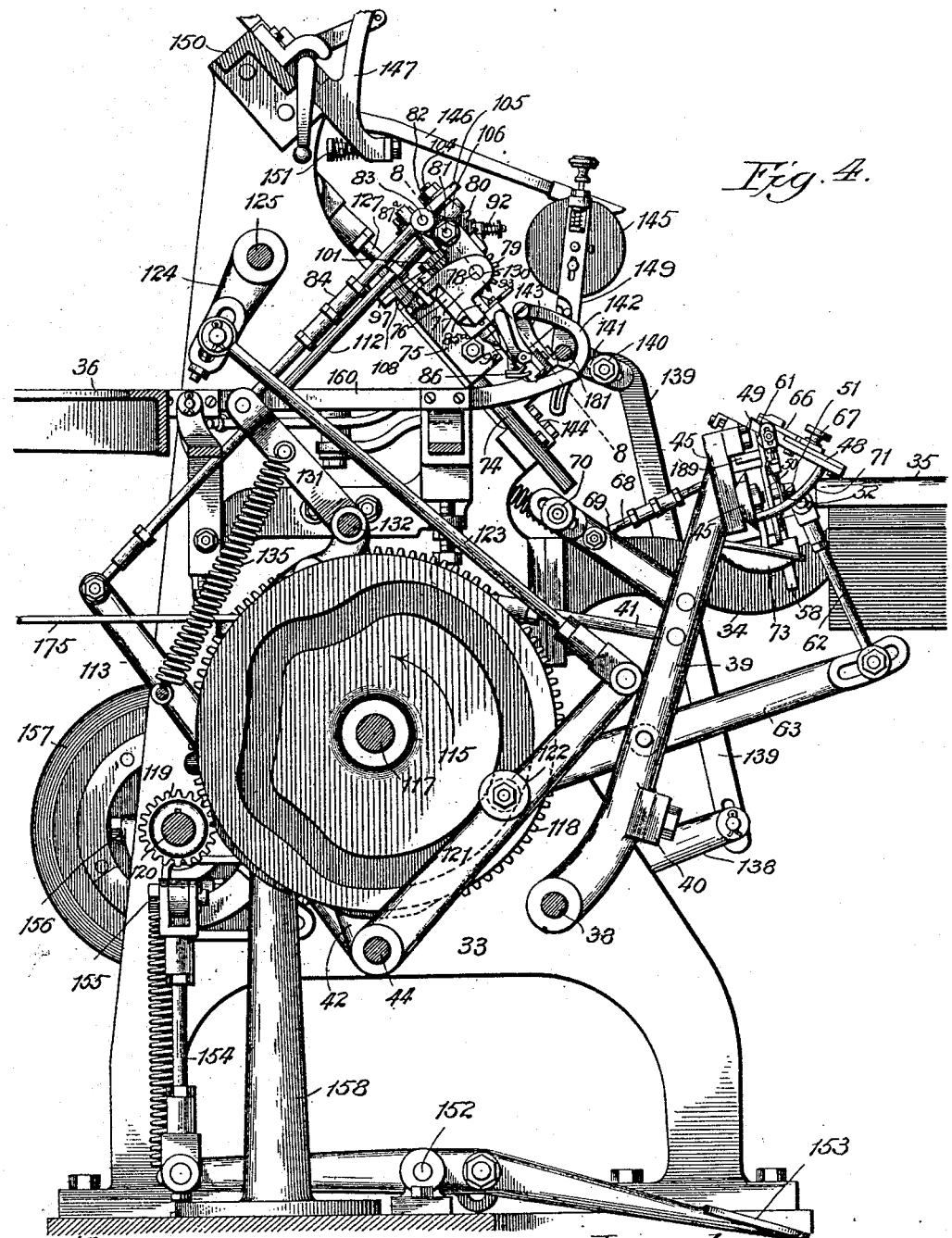
Figure 4 is an enlarged view partially in section, taken vertically through the machine, toward the left side and looking to the right, or in the same direction as the view of Figure 2.
Figure 5:
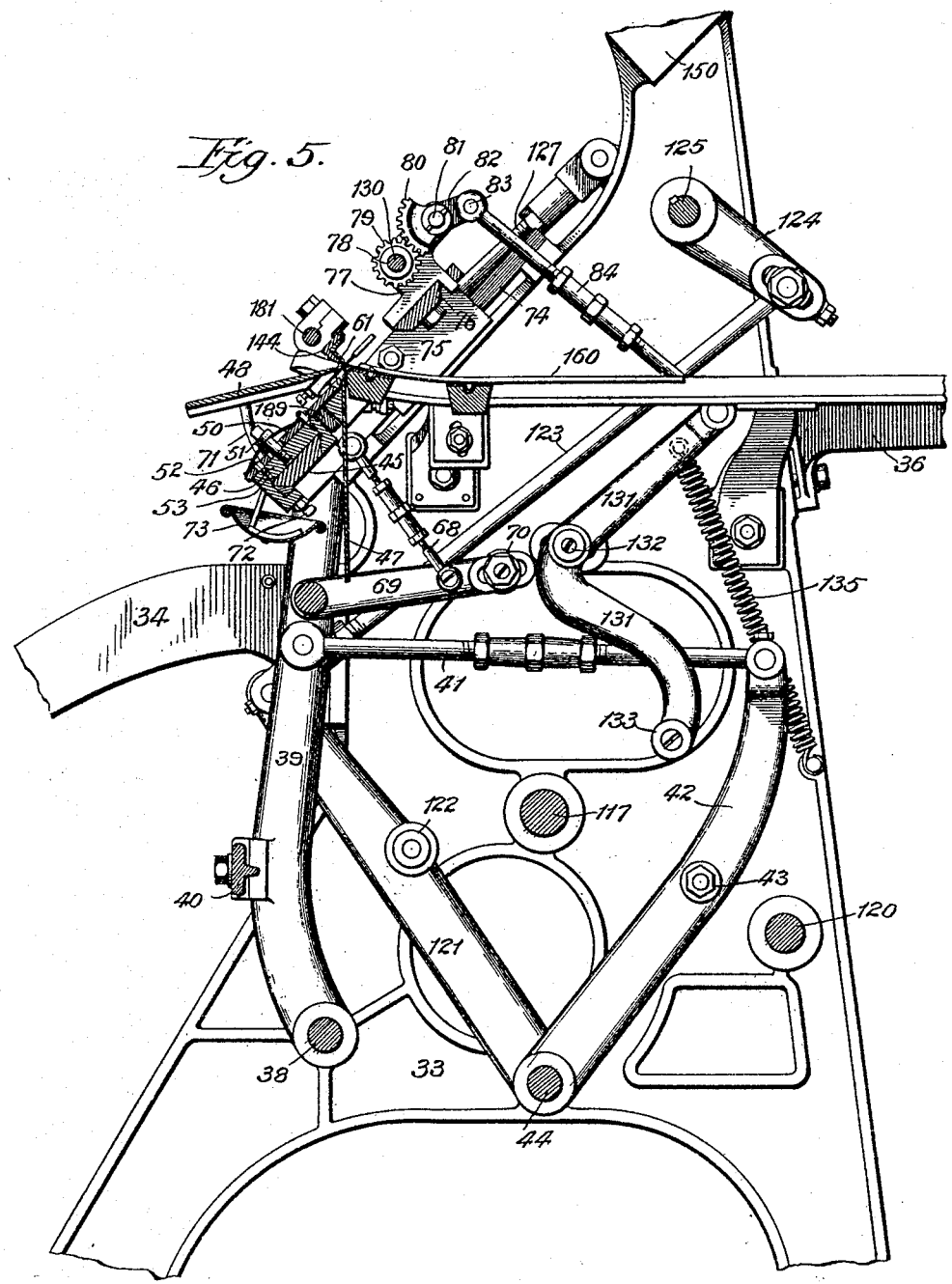
Figure 5 is a partial vertical section through the machine, taken near the center and looking in the opposite direction to Figure 4,—that is, to the left.

Referring first to Figures 4 and 5, it will be seen that I provide upon the horizontal shaft 38, two lever arms 39, pivoted thereon, which at their top carry the bar 45, extending across the front of the machine. The arms 39 are bound together by the cross bar 40, as shown in Fig. 5. From Fig. 16 it will be seen that the bar 45 is provided with a dove-tailed rib thereon, upon which are slidably mounted the looper carriers 46, which are two in number, and support upon their outer faces each a series of loopers, as indicated by the figure 50 in this view, and shown in detail in Figures 19 and 20 in plan view. These two supporting blocks 46 are movable to and from each other along the bar 45. Slotted through the bar 46 is a longitudinal bar 189, shown in Fig. 16, which is connected to the link 68, and this by the lever 69 is reciprocated to raise and lower the looper points 61 at the proper time. From Figures 16 and 19 it will be seen that each of the loopers 50 is held down independently, guided by the screws 53, and under the spring 52, which straddles the bolt 51, and presses the loopers into place but allows them to be raised by the bar 189 when necessary.

Figure 27:
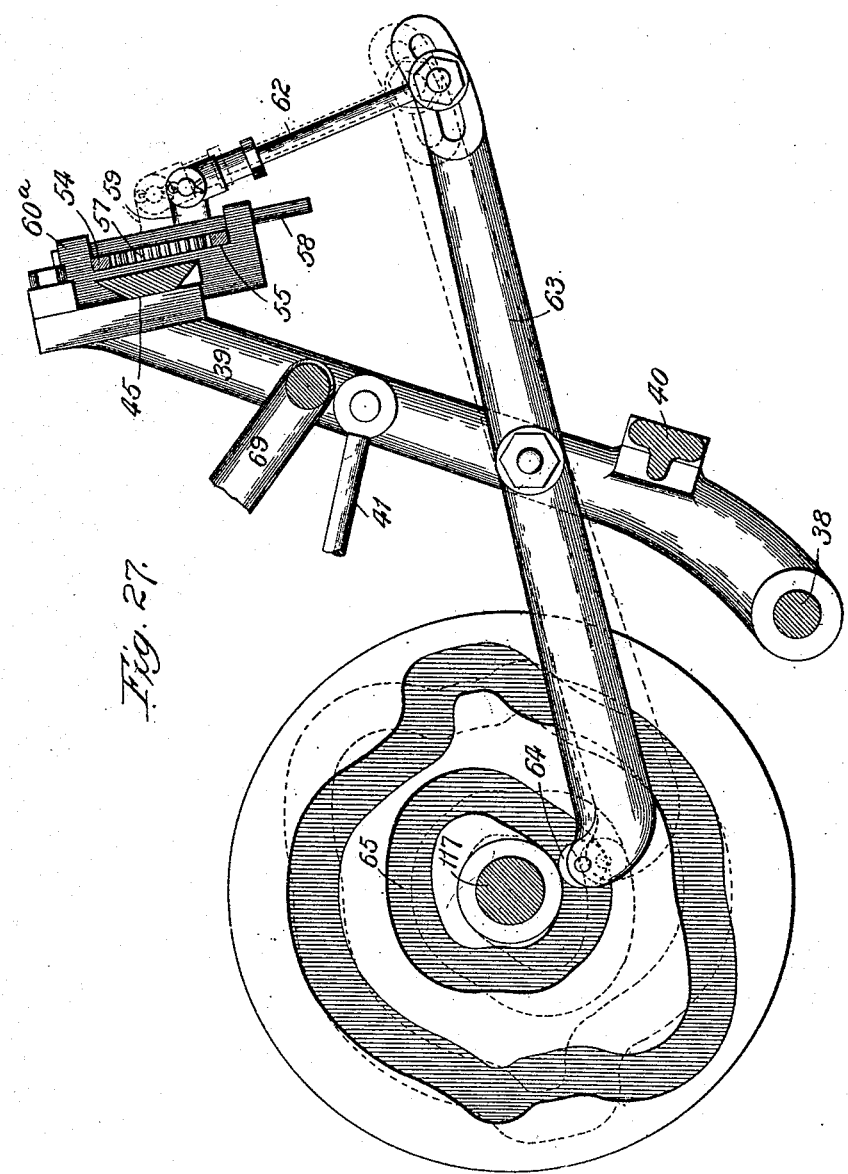
Figure 27 shows the lever arm, links and cam mechanism for operating the shifting devices of the loopers, to be hereinafter fully described.

In the action of the machine it is necessary that the two series of loopers carried on their respective carrier bars 46 shall be reciprocated to and from each other along the bar 45; and for this purpose I have provided the looper carriers with the rods 54 and 54ª, and each of the latter rods is provided with a rack, 55, 55ª, which coöperates with the gear wheel 57 upon the shaft 56; and this latter is reciprocated by the reciprocal motion of the rack 58, which by means of its stud 59, shown in the perspective view of Fig. 21, is reciprocated by the link 62 and the lever 63, coöperating with the cam 65, as shown in detail in Fig. 27.

Between the two arms 39, as shown in Fig. 7 particularly, and in section in Fig. 16, the saddle for the signatures is comprised of two wings 47 and 48, the latter of which is held adjustably in position by means of the hooks and screws 177, and is supported adjustably as to its angle by means of the bar 71. It is removable in order to inspect or adjust the loopers, etc. Beneath the bar carrying the loopers is arranged a drip cup 73 to catch oil, and it will be understood that there are proper adjusting screws, as 72, for fixing the position of the bearings of the looper carriers on the bar 45.

A section through the driving mechanism for reciprocating the looper carriers is shown in detail at Fig. 17, where the gear wheel 57 mounted upon the spindle 56, operates the two longitudinal racks 54 and 55, and is itself driven by means of the reciprocating rack 58, driven by the stud 59, as before described.

The saddle formed by the meeting edges of the two wings 47 and 48 is of course perforated at 49, in order to allow entry of the needle to the position of the looper hooks 61, as will be plain from Fig. 16. In order to reciprocally move the saddle to and from its place the levers 39 are pivoted upon the rod 38, and being articulated with a link 41 to a lever arm 42, the latter is actuated by the cam stud 43, coöperating with the cam 161 on the shaft 117, as will be apparent from Figures 23 and 24.

The saddle 48 being in the position shown in Fig. 1, and a bundle of folded leaves of paper called a "signature" being saddled thereon, and the arms 39 then swinging up vertically and to the right in said figure, the saddle is brought into place by abutment of the bars 45 with the guide 74, as will be plain from Fig. 4.

Figure 8:
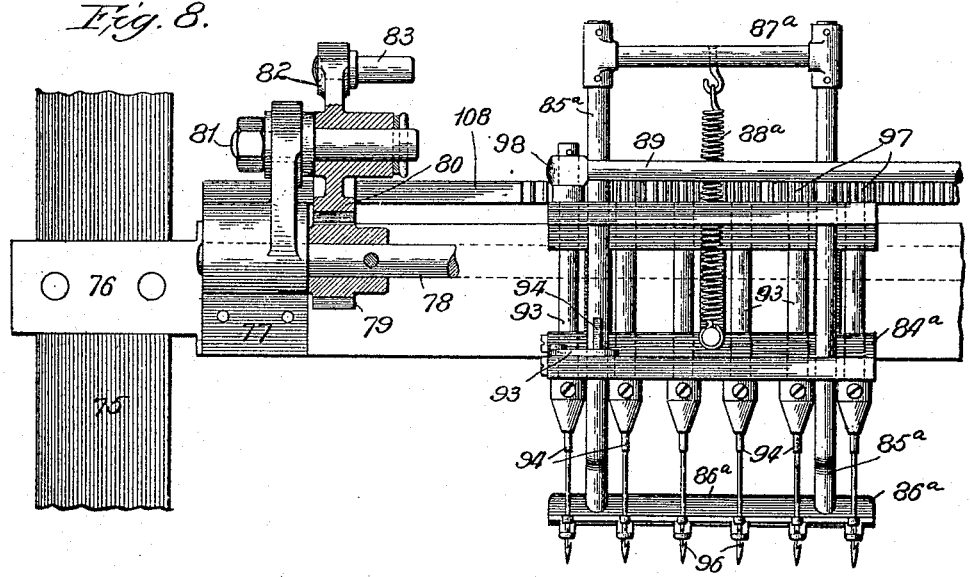
Figure 8 is a partial view showing the frame carrying the gang of needles and its mounting, and a partial section taken along the line 8 shown in Figure 4.
Figure 9:
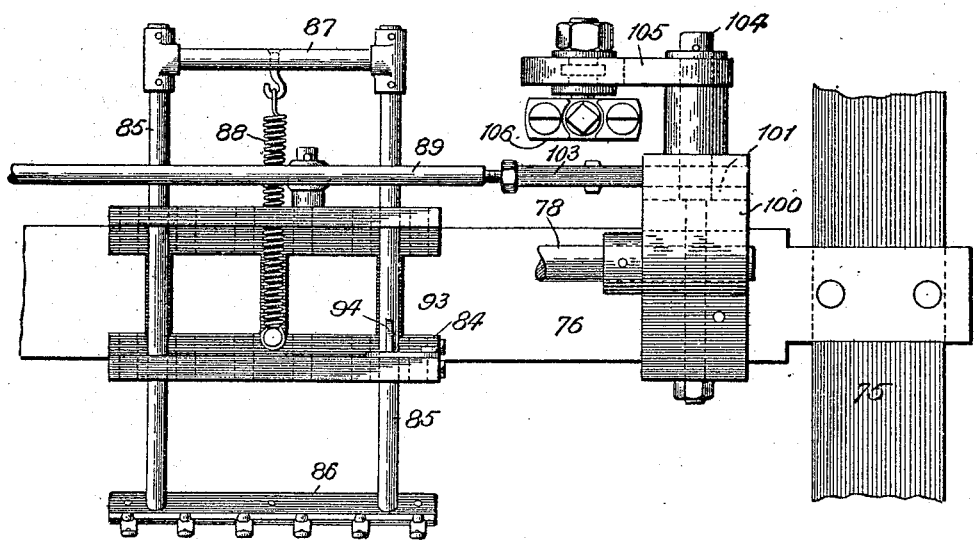
Figure 9 is a view of the other end of the supporting bar and the other frame for carrying the gang of needles, the needles being removed.
Figure 12:
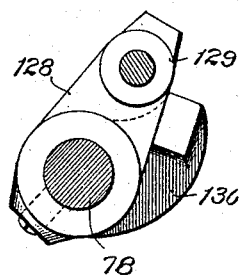
Figure 12 is a rocker arm for the take-up bar.
Figure 10:
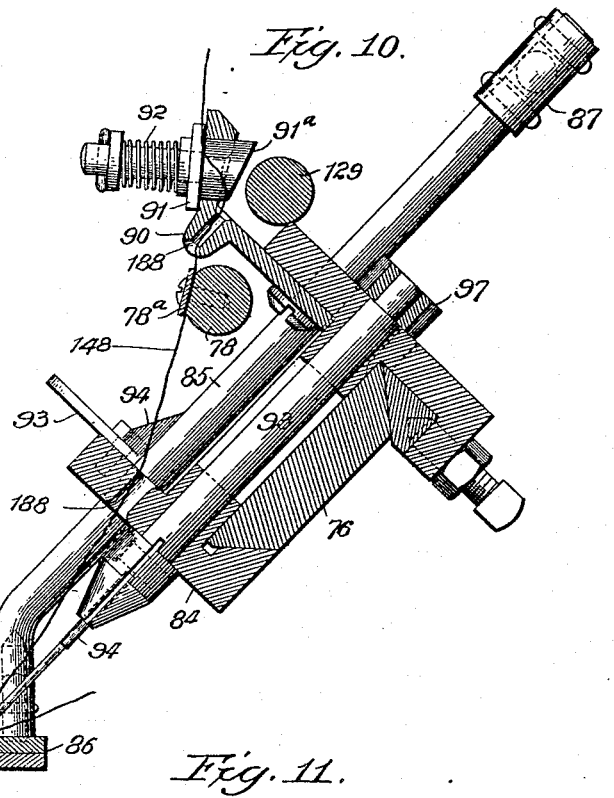
Figure 10 is an enlarged vertical sectional view, showing the mounting of the needle and the needle carrier on its supporting bar.
Figure 11:
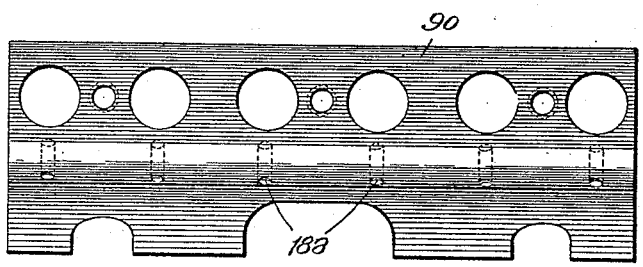
Figure 11 is a plan view of the needle bar guide shown in elevation in Figure 9.

Referring now to Figures 8, 9 and 10 particularly, it will be seen that upon the reciprocating cross heads 75, which move upon the guide bars 74, I place a carrier bar 76, upon which are mounted two gangs of needles placed in the needle frames 84, 84$^a$. The frame 84 is dove-tailed upon the bar 76, and it carries within it the needle bars 93 which clamp in their front ends the needles 94, provided with eyes 95 and hooks 96, as will be clearly understood. In Fig. 10 it will appear that the front upwardly projecting flange of the carrier 84 is provided also with slots to receive the side bars 85 of the frame 87 for the presser bar 86, and also with openings marked 188 for the entry of the thread to guide it to the eye 95 of the needle. Upon the downward motion of the bar 76 carrying the needle frame 84, the presser bars 86 first come in contact with the signature upon the saddle, and thereupon the continued motion of the bar 76 and the frame, carries the needles down through the signature and through the openings in the saddle in a position to coöperate with the loopers, as heretofore described. In this motion the spring 88 is extended so that upon the return motion, the frame 85, 87, of the presser foot 86 may be returned to its proper position against the stop 94 upon the frame 84, which catches against the stop 93, as shown in Fig. 9.

Fig. 10 shows the upwardly extending bars 90 which carry the tension devices 92, as is customary in sewing machines, and the thread from the opening shown in the bars 90 passes under presser spring 78$^a$ on the rod 78, continues through the hole 188, and through eye 95 of the needle, as heretofore described.

Figure 14:
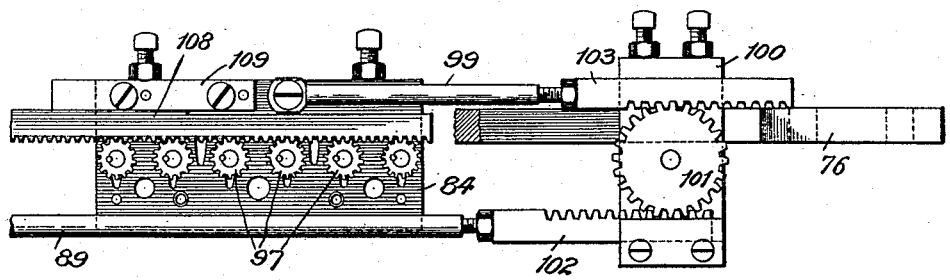
Figure 28:
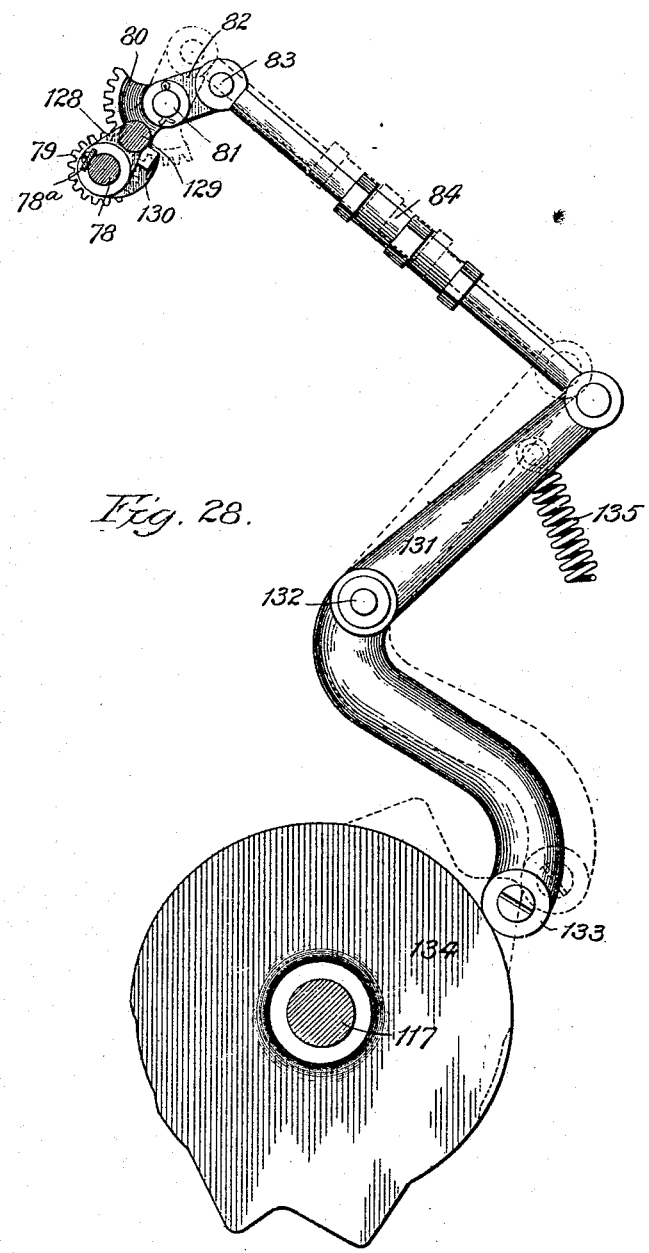
Figure 28 is an enlarged detailed view of the pinion, rocker, lever arm, link and cam mechanism for imparting the motions of the take-up mechanism, as will be hereinafter described.

In the action of the machine it is necessary to shift each of the gangs of needles sidewise intermittently and meanwhile to rotate the needles, in order that the hooks 96 thereon may catch properly under the thread in withdrawing the loop formed by the next adjacent needle before the shifting. For this purpose I provide each of the needle carriers 84 with an actuating rod, 89, 99, and each of these rods is provided, as will be apparent from Fig. 14 particularly, with a rack 102, 103, which coöperates with the gear 101, placed in the housing 100 (Fig. 9), and this gear is operated through the rocking shaft 104, by the rock arm 105 attached to the cross head 106 of the link 112 shown in Fig. 29, this latter link being reciprocated by means of the lever arm 113, which is actuated by its cam stud 114 in the slot 116 of the large cam 115, placed upon the central driving shaft 117. The tension operating bars 129 and 78, as will be apparent from Fig. 10 and Fig. 8, are oscillated by means of the pinion 79 and the curved rack 80 mounted upon the stud 81, and by means of the rock arm 82 connected to the link 84 driven by the bell crank lever 131 which is pivoted at 132, as will be apparent from Fig. 28, and is reciprocated by coöperation of the cam stud 133 with the cam 134 mounted upon the central driving shaft 117.

Figure 13:
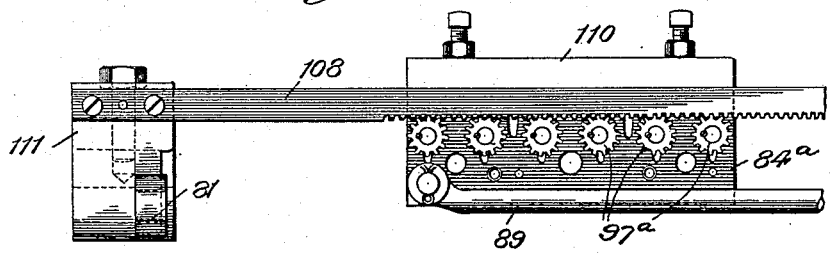
Figures 13 and 14 are detail plan views of the mechanism for rotating the needles.
Figure 15:
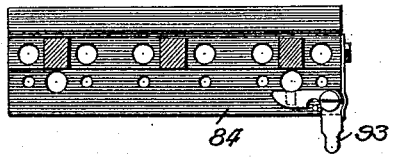
Figure 15 is a plan of the frame 84 of the needle carriage.

Besides the reciprocating motion of the entire set of needles in the gangs and of the two gangs together to and from their work, and the sidewise shifting movement necessary for carrying the looped thread from one position to the next, the needles are required to be independently revolved about their centers twice during the motion. From Figures 13, 14 and 15 it will be seen that this motion is accomplished simultaneously with the shifting by means of the fixed rack 108, which extends longitudinally from the two blocks 100 and 111 fixed upon the cross bar 76. As the needle frames 84 are reciprocated to and from each other, the pinions 97 upon each of the needle bars are caused to rotate by coöperation with the fixed rack 108, as will be apparent from Fig. 14.

Figure 26:
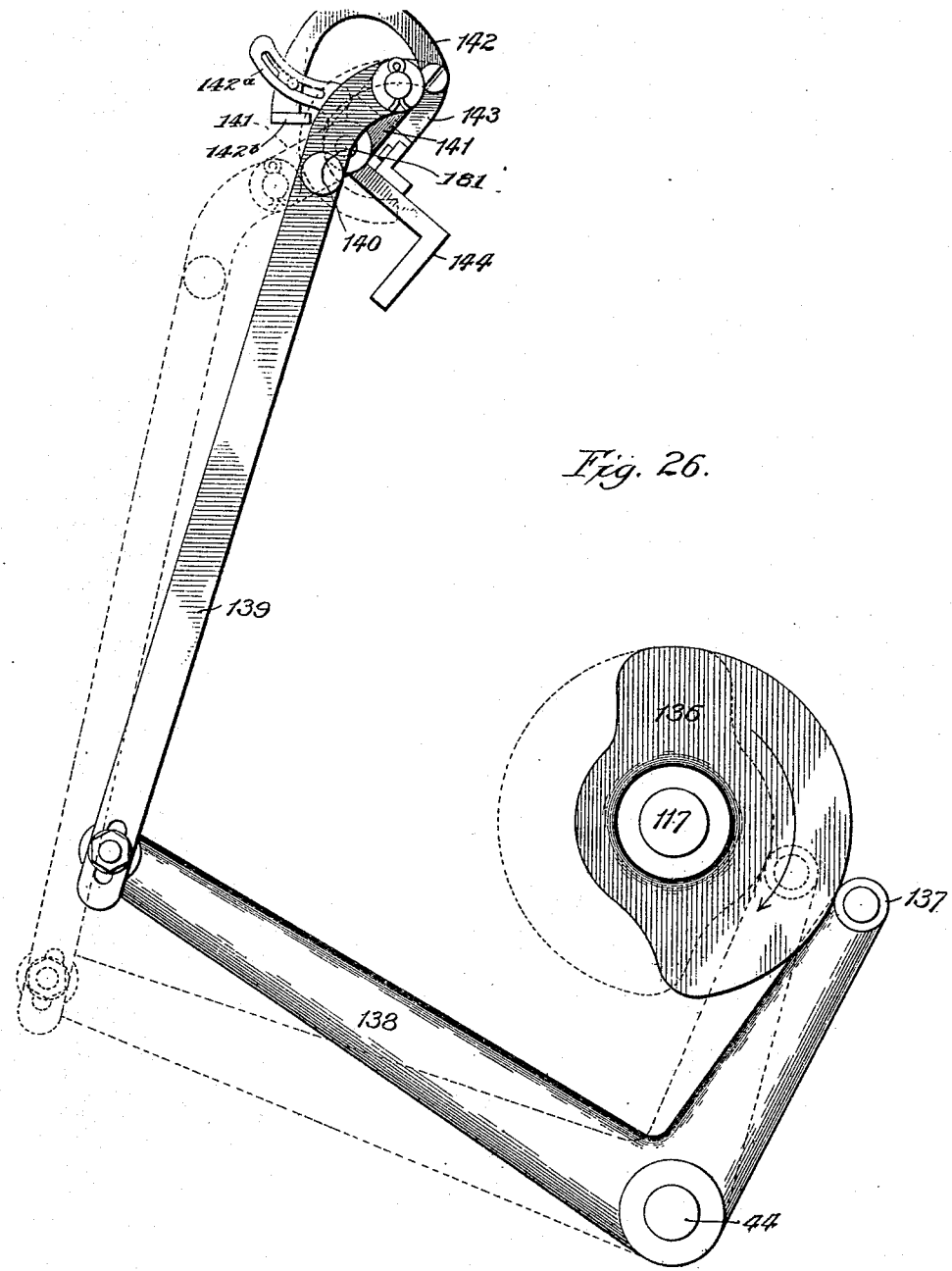
Figure 26 is an enlarged detailed view of the lever arm, link and cam mechanism for operating the pusher or shifting device for the signatures.

Referring to Figures 4, 7 and 26; after the series of stitches is completed in each of the signatures and the loop is drawn up in position to be carried to the next signature, the signature is pushed against a resistance provided upon the inside of the rails 36 such as the previously sewed signature, by means of the presser arm 142, pivoted on bracket 143 and connected by links to shaft 181 which is rotated by the link 141 and link 139 and the bell crank lever 138, which is rocked by coöperation of the cam stud 137 with cam 136, fixed upon the shaft 117. The presser bar 142 is mounted upon the upright 143, fixed to a cross bar 144 extending between the guides 74, as will be apparent from Fig. 4.

Figure 6:
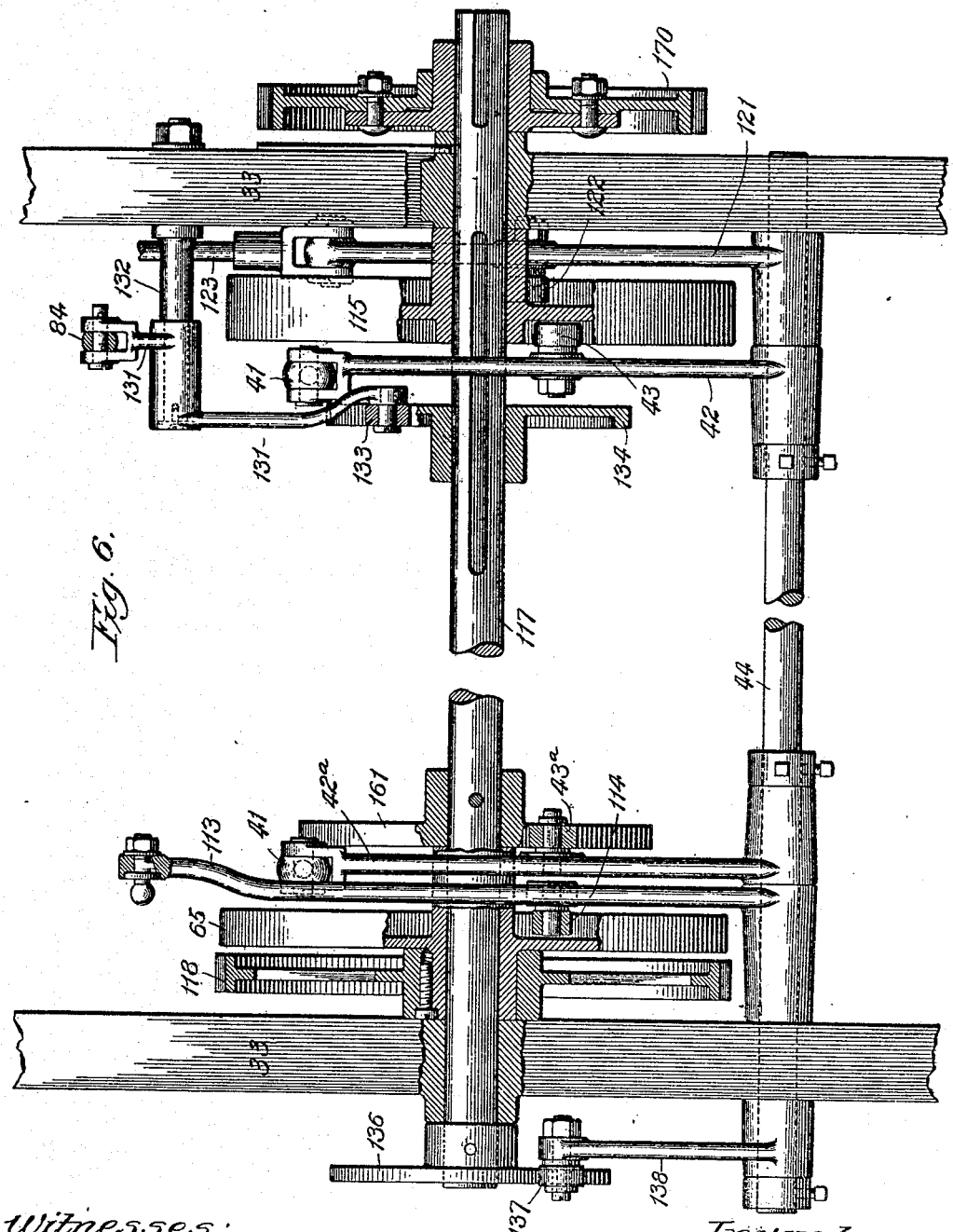
Figure 6 is a partial vertical section showing the two ends of the machine, taken along the center line of the main driving shaft shown at the center of Figure 4 and marked 117, most of the machinery being removed except the cams and gears upon the central driving shaft.

The entire machine is operated by power from the belt pulley 157 and the shaft 120, which through gears 119 and 171, turns a large gear wheel 118, and gear 170 at the other end. As will appear from Fig. 6, gear 118 is splined to the sleeve of the large cam 65, and the shaft 117 revolves within it and carries the cams 134, 136, 161 and the double cam 115. All the levers are worked in their reciprocating motions directly or indirectly from the center cams, and each of the several cams for operating the lever arms is shown in a separate figure together with its connecting links. It will be understood, of course, that retractile springs, such as 135 in Fig. 5, are provided upon the lever arm 138, while the weight of the saddle acts on arm 138 by means of link 139, to return them to normal position after they are actuated by the cams.

The machine is thrown into operation by means of the foot lever 153, which is pivoted upon the shaft 152, and to the link 154, and bell crank 155 throws the friction clutch 156ª into operation, as will be understood without further explanation. The stanchion 158 is provided with a screw 159, in order to adjust the level of the receiving table 175 for the bound leaves. The hand wheel 174 upon the shaft 173 is provided with a bevel gear which coöperates with the gear wheel 172 upon the main driving shaft 120, and by this means the position of the needles may be adjusted by hand before the machine is thrown into operation or the signatures put in place. The mounting of the spools for the thread and the various tension devices are as ordinarily provided in sewing machines, and need no further explanation. The tension and release device is illustrated in detail in Figures 7, 10 and 18, and its operation will be readily understood from the references above; that is in Figure 18 it will be seen that the rocking of the bar 78 actuates the rod 129 by means of spur 130, and thereby temporarily raises the tension plates 91 by striking the studs 91ª, as shown in Fig. 10.

Figure 29:
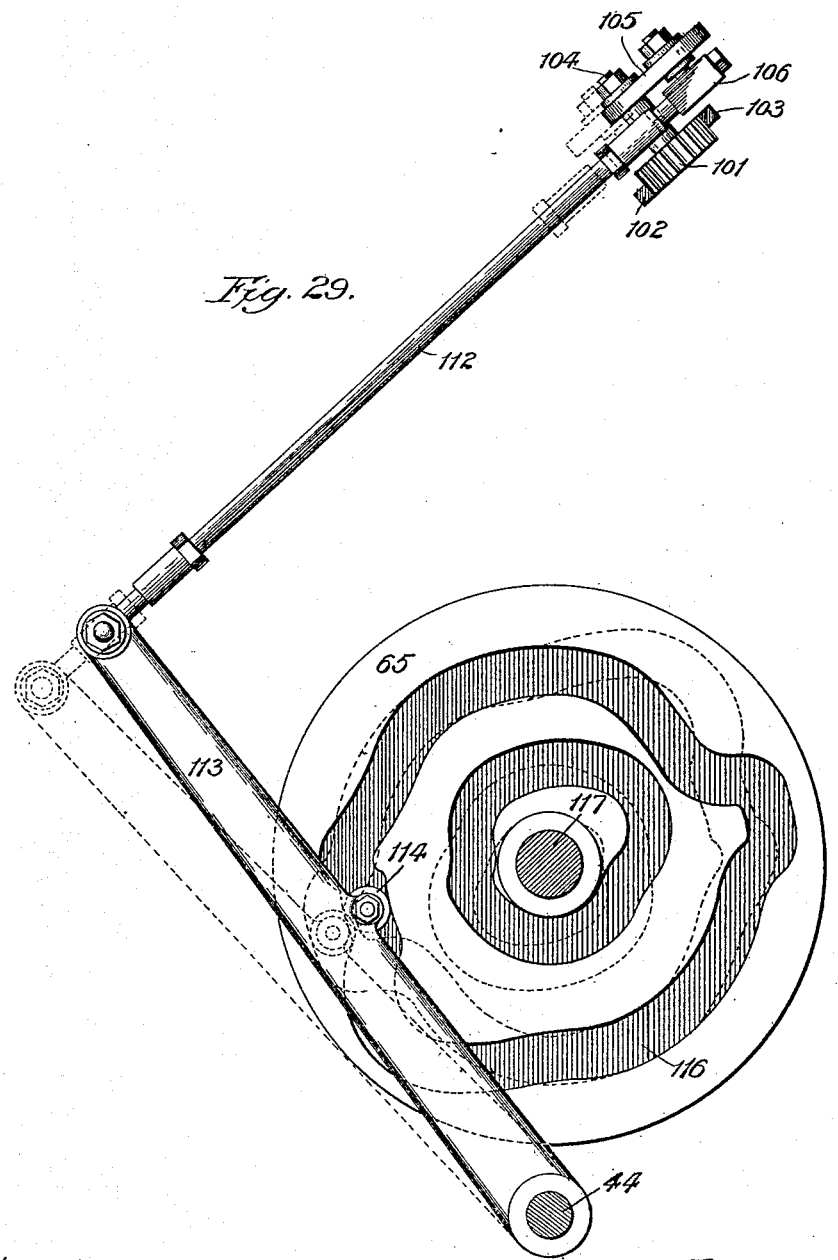
Figure 29 shows the gearing, lever arm, link and cam mechanism for laterally shifting the needle carrier frames and to rotate the needles.

From an examination of Figures 30 to 32ª it will be apparent that each loop of the thread passes down into the signature, across to the position of the next needle, up through and out of the signature, and then diagonally still further to the side, to the position of the third needle and also across under the next signature. The machine is designed to sew three of such stitches on each side of the center of the book, in the present instance. In carrying out this operation (Fig. 10), the thread being passed through the tension devices as before described, goes through the eye of the needle 95, and when the gang of needles is thrust through the paper, is carried downward and then the needle being slightly withdrawn, the thread forms a loop under the opening on the left of Fig. 32. At this time the looper hook 61 will stand in position to surround the end of the needle and all the needles will have their own hooks in the direction indicated in Fig. 32. At this time the loopers stand in the position shown in Fig. 19. The loopers are now raised to avoid the needles, by the bar 189. The motion of the arm 63 as indicated in dotted lines in Fig. 27, then pushes the rack 58 over to the left in said figure, which revolves the gear wheel 57 and through it the racks 55 and 54 are actuated. This operation will bring the position of the loopers 61 as shown in Fig. 20, by which motion the looped thread 148 is carried from the needle to the left in Fig. 32 to the position shown in said figure, the tension plates 91 being raised momentarily, and it being understood, from a study of Fig. 25, that the needle having beeen thrust down far enough and withdrawn somewhat to form the loop in the thread, remains stationary for a time, and when the looper has reached the position shown in Fig. 32, the needles are again thrust down so that the needle 94 enters into the loop as there shown. At this point, as will be apparent from Figures 13 and 14, and Fig. 10, the sidewise motion of the needle frames 84 will have caused the pinions 97 to coöperate with the rack 108, and turn the needle in such position that the hook 96 is then in proper relation to the thread to seize upon it, and when the hook to the right of Fig. 32 is drawn upward again, it carries with it the loop formed originally by the needle on the left, it being understood that the racks 102, 103, are operated by the wheel 101 through the arm 112, as shown in Fig. 29. The reverse motion of the gear wheel 101 will thereupon carry the two needle frames back again to their original position, after turning the needle with its hook forward, to retain the thread, and at the same time the bar 142 will thrust the signature back and bring into position the next succeeding one, by which it will be seen that the loop of the thread 148 (Fig. 30) is carried over diagonally to the new position of the thread in the signature 181, and thereupon when the needle is again thrust down by the motion of the carriage 75, through the link 127, the needle now enters into the loop formerly made by the needle next to the left, and the stitch will be formed as shown clearly in Fig. 31.

Figure 23:
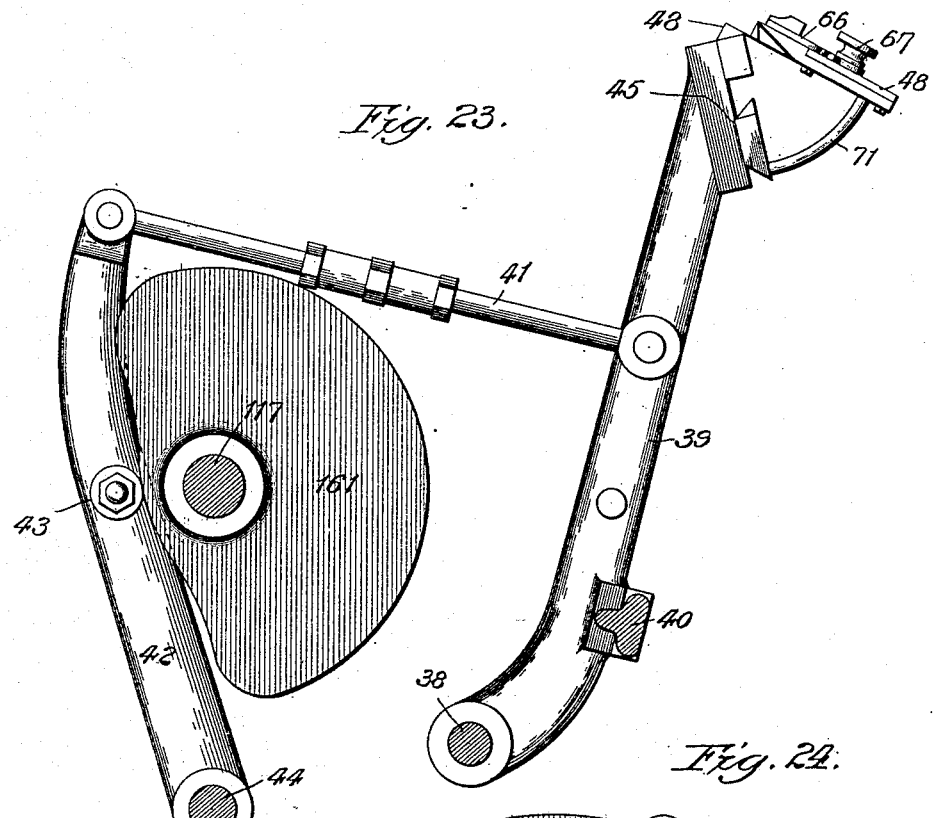
Figures 23 and 24 are enlarged detailed views of the lever arms, link and cam mechanism for pivotally shifting the supporting saddle for the signatures.
Figure 24:
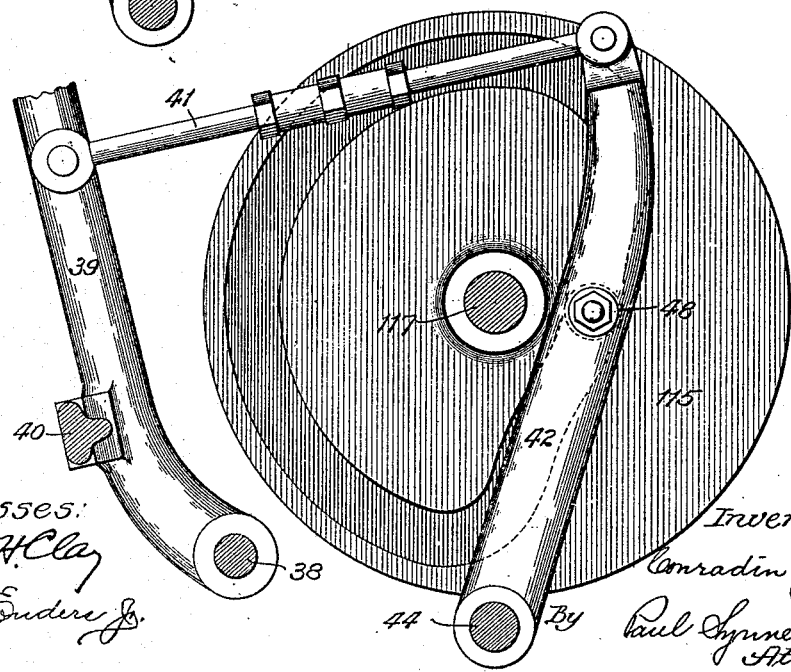

From Figures 23 and 24 it will be seen that the saddle for carrying the signatures has a simple to and fro motion, resting alternately in its place against the needle bar and presser foot and against the table for the receipt of a new signature. From Fig. 25 it will be seen that the carrier bar of the gang of needles on the head 75, has a reciprocating motion and is stationary through a part of the turn of the cam, and then reciprocates back and forward twice, and again has a stationary period.

From Fig. 26 it will be seen that the presser arms 142 for removing the signatures have a simple to and fro motion, with a rest at either end of the motion. From Fig. 28 it will be seen that the rock bar 78 of the take-up mechanism is stationary through a large part of the circumference of the cam 134, and then has two short reciprocations at one point. The motions imparted by the cams in Figures 27 and 29, operating the racks respectively for shifting the loopers and for shifting the needle gangs, are complicated motions best explained by examining the resultant action of those parts as heretofore described.

Figure 3:
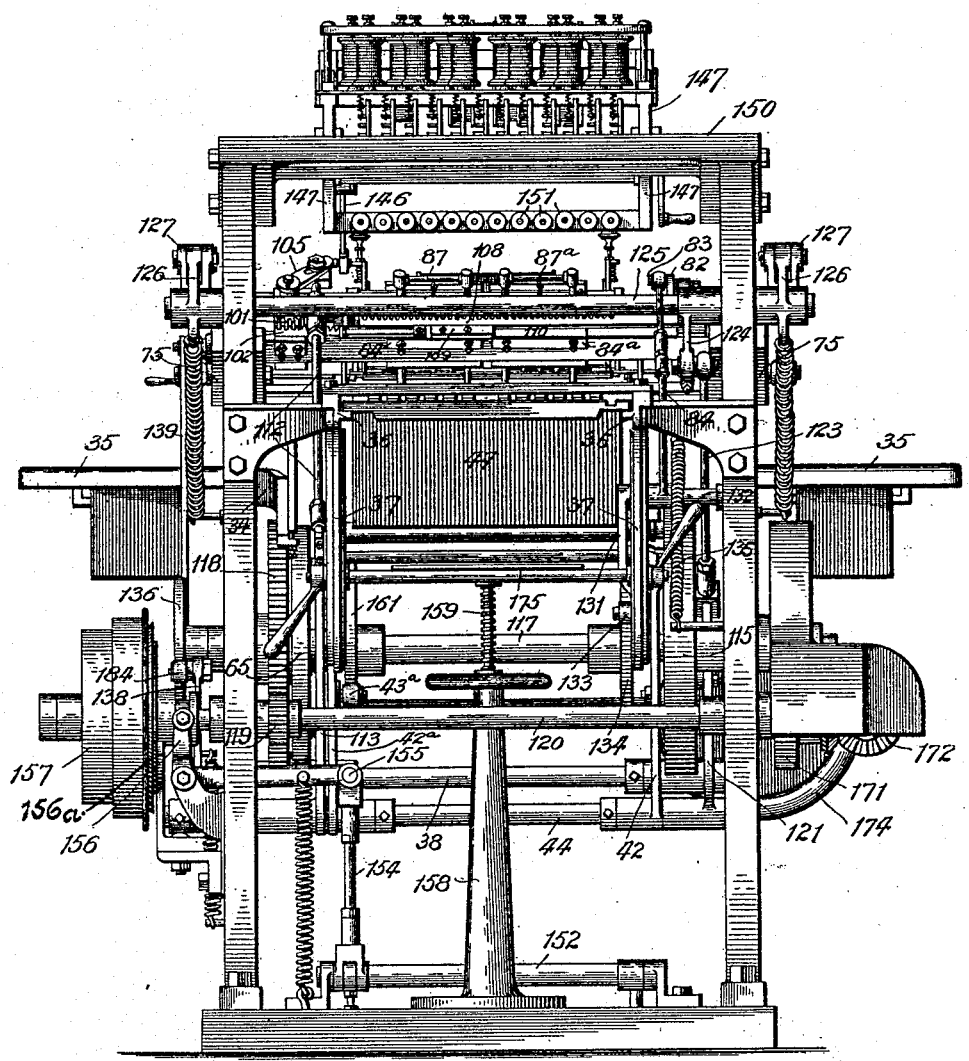
Figure 3 is a rear elevation of the complete machine.

From the above description of the parts and illustrations, it will be seen that the operation of the machine is as follows:

The signature is saddled upon the saddle 48 when it is in a downward position on a level with the table 35, when the levers 39 throw the saddle backward, bring the bars 45 against the guide-ways 74, then the edge of the signature is seated firmly within the bars 142 and against the preceding signature, and held in place therein. The cross head 75, carrying the bar 76, is then reciprocated downward, driving the needles through the paper and through the opening 49 in the saddle; the presser bar first coming in contact with the paper and then being allowed to recede against the tension of the spring 88, as heretofore described. The tension devices for the thread being loosened at this point, the thread is carried through, when a slightly retrograde motion of the needle forms a loop and immediately the looper hook 61 seizes upon the looper thread, and by the sidewise shifting movement of the looper carriers by means of the reciprocation of rack 58, the thread is carried from each of the needles to the next succeeding needle and slightly beyond, the separate looper hooks in each case being raised by inward thrust of the rods 189 so as to escape the needles as they pass. The loop then being properly placed, the needles are again driven downward and the needle now opposite the loop just carried over enters the formed loop, when the needle is turned upon its axis in position to seize upon the thread with the hook, and is thereupon withdrawn out of the signature, drawing the looped thread with it. The entire gang of needles is then shifted sidewise in proper position to bring the next stitch alternating with the last stitch and carrying the loop just drawn out with it, and meanwhile the presser bar 142 thrusts the signature back and brings in place the next one, and the following stitch is taken therein the new loop passing through the former loop carried out and over, as will be clearly seen from drawing, (Figures 3, 4 and 5), the needle being turned as it takes this sidewise motion so as to have the hook in front and insure a good hold upon the looped thread. Thus each of the needles successively forms a loop of itself, delivers the same to the looper and the looper carries it to the next succeeding needle, and when it is withdrawn receives a loop itself from the next preceding needle, and in its next inward motion through the paper carries its own thread through the loop previously formed by the next preceding needle.

The resulting stitch formed is that shown in Figures 30 and 31, in which it will be apparent that each of the signatures is independently stitched by two threads from the two sides, that the stitches across the back alternate in position with each other, and that in each case every stitch has an independent anchorage at each end, so that in case the threads are broken in any one place it will only destroy the stitch immediately following the break. The tension devices being regulated as is well understood in like machines, the separate signatures are bound close together as the sewing proceeds and the thread and the stitches in each case are continuous from one signature to the next, as will be apparent from Fig. 30.

Having thus described my invention and its uses, what I claim and desire to secure by Letters Patent, is the following:

1. In a book sewing machine the combination with several relatively movable sets of vertically reciprocating needles, of a reciprocating supporting saddle for the signatures, several coöperating sets of loopers mounted upon the saddle and each looper adapted to carry the thread from one of said needles to the next succeeding one in the set, means for rotating the needles, means for oscillating the loopers vertically and means for reciprocating them longitudinally, and means for laterally shifting the separate sets of needles on their support in opposite directions with each alternate movement of the saddle and signatures, whereby a loop of thread is carried from one signature in a diagonal direction to the next, and there interlooped with another loop of thread.

2. In a book sewing machine the combination with several relatively movable sets of vertically reciprocating needles, a reciprocating supporting saddle for the signatures, a looper carrier bar thereon having means for laterally shifting it and the looper adapted to carry a loop from one needle to another in the set, means for vertically lifting the loopers to avoid the needle in passing, and means for laterally shifting the set and for revolving each of the needles.

3. In a book sewing machine the combination with several sets of needles, a support for said sets, means to vertically reciprocate said support, a reciprocating signature supporting saddle, a looper carrier bar mounted in the said saddle and longitudinally shiftable therein, loopers individually vertically oscillating to avoid the needles, and adapted to carry a loop of thread in both directions, to enchain it alternately with one of the needles on each side of the looper and means for moving said loopers and saddle support.

4. In a book sewing machine, a vertically reciprocating carrier bar, a series of needle frames with gangs of needle bars carrying needles thereon, gearing for rotating all of the needle bars on their longitudinal axes carried on and moving with said carrier bar, a presser bar provided with guides for the ends of said needles and a reciprocating saddle carrying therein and movable therewith, a series of gangs of reciprocating loopers to coöperate with said needles and means to operate them, substantially as described.

5. In a book sewing machine in combination with two sets of needles, a signature supporting saddle and a looper mechanism thereon, comprising a bar and two reciprocating frames, a series of loopers on said frames, each of said loopers having a double inturned hooked end, means for laterally shifting the looper carriers in opposite directions and means for raising the loopers vertically off their seats as they pass the needles, substantially as described.

6. In a book sewing machine, the combination of a pair of needle carrier frames supporting a gang of needles, a support upon which the carrier frames are mounted, means to reciprocate the needles longitudinally and means for reciprocating the carrier frames comprising a thrust bar, a rack adjustably attached thereto each thrust bar beng attached to a carrier frame and means for operating each rack so that the carrier frames are reciprocated in opposite directions.

7. In a book sewing machine, in combination with two gangs of reciprocating needles and means for reciprocating them, a signature supporting saddle containing therein a pair of shifting carriages, a set of loopers upon each carriage, springs to hold them down upon the carriage and means to lift them as they pass the needles, and driving means comprising an adjustable rack attached to each carriage, and a rotary gear wheel mounted in the saddle engaging both racks, and an operating rack mounted in the saddle and engaging said gear wheel to operate the loopers, substantially as described.

8. In a book sewing machine the combination with a gang of reciprocating needles and means for actuating them, of a supporting saddle and a set of loopers thereon, coöperating with the needles, comprising a bar and a carriage sliding thereon, studs on the carriage for supporting and guiding each looper, springs holding the loopers down, means to raise the loopers as the loopers pass the needles, and means to reciprocate the loopers in opposite directions, movable with the signature saddle.

9. In a book sewing machine the combination with a supporting saddle of a plurality of looper carriers thereon, an adjustable rack attached to each of said carriers, a coöperating rotary gear wheel mounted upon the saddle meshing with the racks to shift the looper carriers in opposite directions, a driving rack also mounted upon the saddle and engaging said gear, and actuating levers for imparting reciprocating motion to said actuating rack.

10. In a book sewing machine in combination with a signature supporting saddle containing a pair of laterally shifting gangs of loopers and means for moving them, a laterally reciprocating gang of needles, means for revolving the needles, means for withdrawing the needles and laterally shifting the same as each signature is removed, whereby a loop of thread is carried from one signature in a diagonal direction to the next and there interlooped with another loop of thread, in combination with a presser arm for removing the signature after the stitch is formed.

11. In a book sewing machine the combination of a set of loopers with means for laterally shifting the same and means for raising them off their seats, a reciprocating gang of needles having means for rotating the needles means for laterally shifting the gang of needles, a signature supporting saddle, a presser bar for removing the signature from the saddle, and actuated mechanism for imparting all of said movements, substantially as described.

12. In a book sewing machine in combination with a double acting looper for transferring looper threads from one needle to another toward each side of the looper, two gangs of needles, means to vertically reciprocate the needles, means to simultaneously shift the gangs laterally in opposite directions, and means for revolving each needle upon its axis.

13. In a sewing machine the combination with several gangs of needles and means for vertically reciprocating them, of several sets of double acting loopers provided with mechanism for carrying the loops of thread from each needle to the next alternately on either side, and means for shifting the gangs of needles laterally in opposite directions after they have received the loops whereby the stitches formed on adjacent signatures are offset longitudinally with respect to each other and those on alternate signatures are in line, substantially as described.

14. In a book sewing machine in combination with two sets of reciprocating needles, means for laterally carrying a loop of thread from one needle in each set and placing it over the next succeeding needle, and means for shifting the sets of needles after withdrawal longitudinally of the signature in opposite directions, and at the same time moving the signature backward, whereby the stitches formed on adjacent signatures are offset longitudinally with respect to each other while those on alternate signatures are in line.

15. In a book sewing machine the combination of a cross bar and support and two gang needle frames, rack-and-pinion gear to laterally shift the frames, mounted on the bar, means to vertically reciprocate the said bar, a reciprocating supporting saddle, a cross bar thereon, two looper carriers thereon and rack-and-pinion gear carried entirely on the saddle to laterally reciprocate the loopers and means to lift them to avoid the needle as they pass the same in sewing.

16. In a book sewing machine the combination of two independent gangs of laterally shiftable needles and means to shift them in opposite directions simultaneously and means to vertically reciprocate them, a signature saddle, two gangs of loopers thereon and means to laterally shift them in both directions to coöperate with the needles, substantially as described.

In testimony whereof I have hereunto set my hand in the presence of the subscribed witnesses.

CONRADIN JOOS.

Witnesses:
GEORG HÖHL,
A. LIEBERKNECHT.